Nov. 5, 1940.　　　　H. G. TITUS　　　　2,220,182
APPARATUS FOR PREPARING SKELP FOR WELDING
Filed Aug. 19, 1938　　　3 Sheets-Sheet 2

INVENTOR
Horatio G. Titus
by his attorneys
Stebbins Blenko & Parmelee

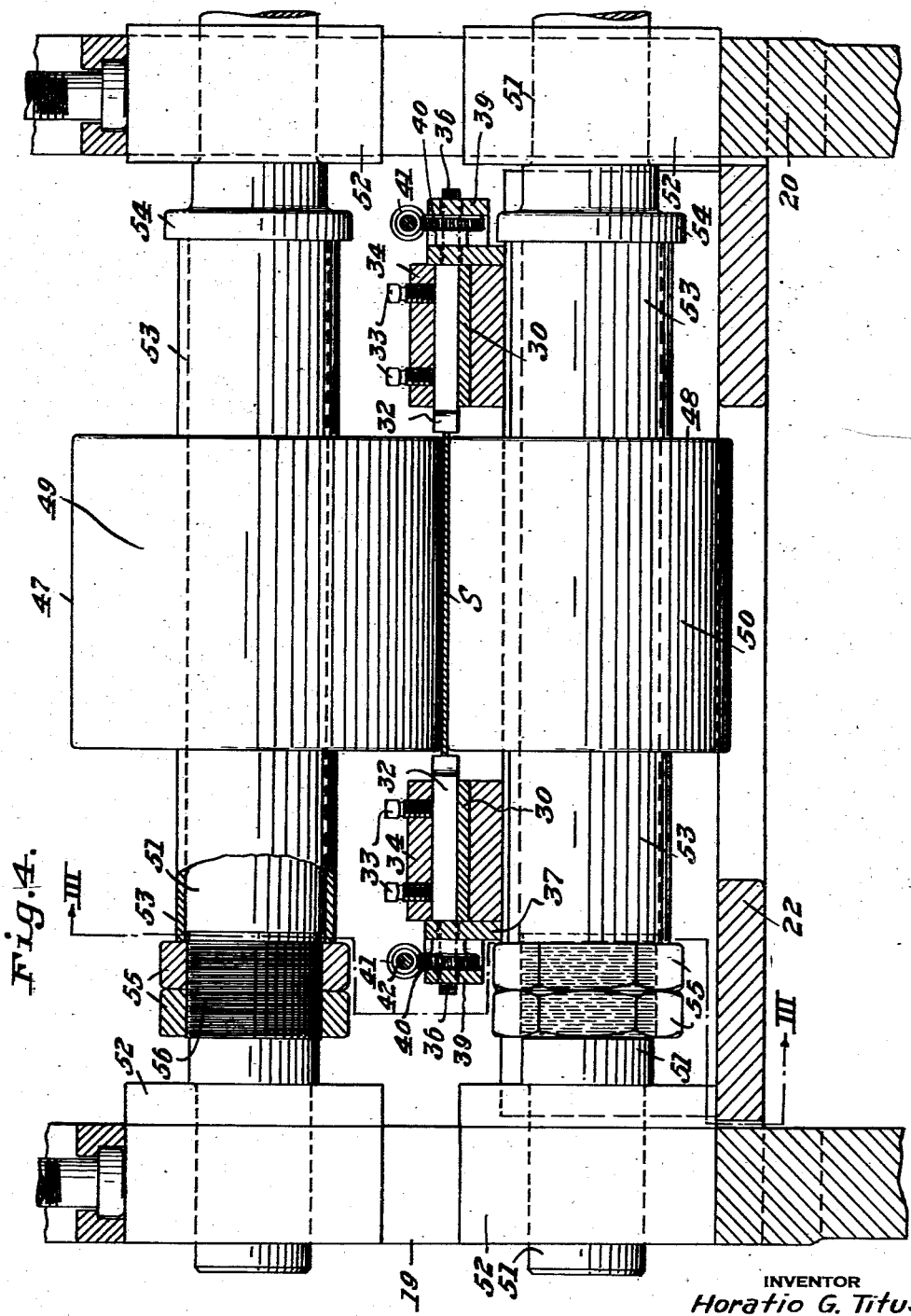

Patented Nov. 5, 1940

2,220,182

UNITED STATES PATENT OFFICE 2,220,182

APPARATUS FOR PREPARING SKELP FOR WELDING

Horatio G. Titus, Youngstown, Ohio, assignor to The Youngstown Sheet & Tube Company, Youngstown, Ohio, a corporation of Ohio Application August 19, 1938, Serial No. 225,751

5 Claims. (Cl. 90—24)

This invention relates to the treatment of the edges of metal plates or the like, such as skelp for the manufacture of tubular products by welding, prior to the actual welding.

It is customary in the manufacture of tubular products from flat rolled skelp by electric welding, to form the skelp into a cylinder with the side edges thereof as rolled, in closely spaced relation. In other words, the skelp has been flat rolled in single widths. Economies can be effected by rolling skelp in multiple widths and then slitting it longitudinally. Where this has been tried, it has been found that the burrs along the edges of the individual widths resulting from the slitting operation have produced a large bead along the welded seam. A more serious objection was the fact that the several lengths of skelp produced by slitting wide strip were not entirely uniform in width because of the imperfect operation of the slitting or shearing apparatus employed. These variations in width prevented accurate alinement of the edges in welding and introduced variations in the contact pressure between the abutting edges at the welding throat, introducing objectionable variations in the operation of the machine and the character of the welded seam. Even when welding skelp rolled in single width, a considerable bead is formed both inside and outside the pipe and it has been necessary heretofore in welding formed blanks to pass them over a mandrel having rolls or other means thereon for flattening or removing the inner bead. This problem is aggravated if the burred edge of skelp rolled in multiple widths is turned inwardly on forming the skelp after slitting to individual width. Similarly, an excessively large burr is formed exteriorly of the pipe if the burred edge of the slit skelp is turned on the outside of the blank. For these reasons, it has been impossible, so far as I am aware, to take advantage of the economies resulting from the rolling of skelp in multiple widths.

I have invented an apparatus for preliminarily treating skelp rolled in multiple widths and then slit to size, which avoids production of an excessively large bead inside or outside the welded pipe and, in addition, makes it possible to dispense entirely with the mandrel which has always been necessary heretofore in welding pipe, for working on the interior bead. My invention also makes it possible to impart to the edges of the slit skelp any desired contour to facilitate the welding operation. In accordance with the invention, I subject the edges of the slit skelp to a trimming operation before the skelp is formed into a blank. The trimming operation may conveniently be carried out at the beginning of the forming operation. During trimming, I confine the skelp against lateral shifting, and grip it firmly across substantially its entire width adjacent the point of trimming. The apparatus preferred for carrying out the method comprises principally a stand of pinch rolls and brackets extending inwardly toward the bite thereof, having guides and cutting tools mounted thereon.

The following detailed explanation of the invention refers to the accompanying drawings illustrating the procedure involved and the construction of the apparatus. In the drawings:

Fig. 3 is a view partly in section along the line III—III of Fig. 2 and partly in elevation;

Fig. 4 is a sectional view taken along the line IV—IV of Fig. 3, with parts in elevation; and Fig. 5 is a diagrammatic plan view illustrating the forming of the flat skelp into tubular blanks.

Figure 1:
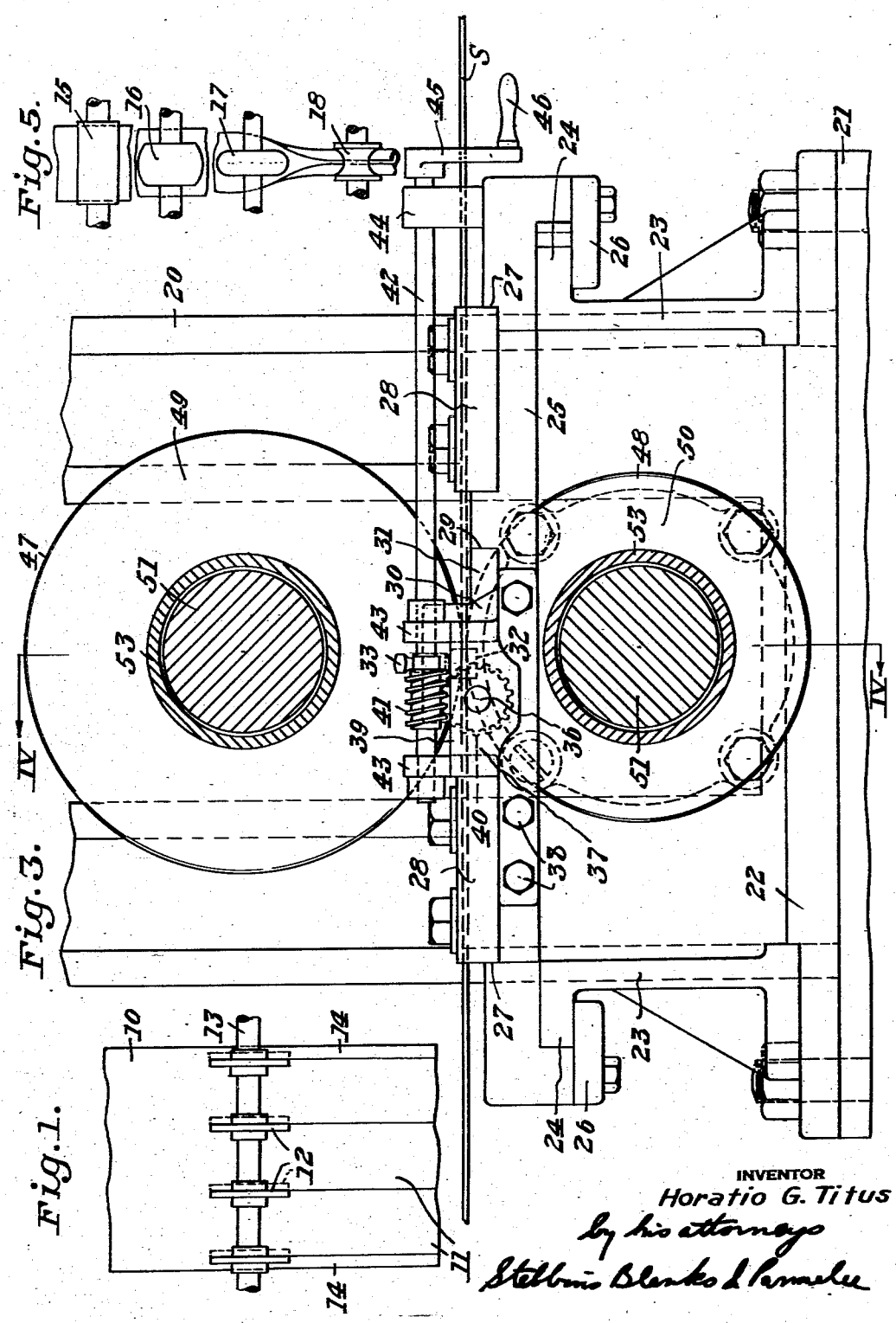
Fig. 1 is a diagrammatic plan view showing the slitting operation by which skelp rolled in multiple width is converted into a plurality of skelp lengths, the width of the individual lengths being determined by the size of the pipe or tube to be manufactured therefrom.

Referring now in detail to the drawings, I roll skelp in multiple widths as indicated at 10 in accordance with known practice. When the rolling of the skelp has been completed, I subject it to a slitting operation as shown in Fig. 1 to subdivide it into separate lengths 11, the width of which is determined by the size of the pipe to be produced. Merely by way of example, I have shown slitters 12 mounted on a common shaft or arbor 13 for performing the slitting operation. Various forms of slitters are well-known and any suitable type may be employed for the operation indicated diagrammatically in Fig. 1. The mill edges indicated at 14 are sheared off and scrapped so that all the individual skelp lengths have sheared edges on both sides.

Figure 2:
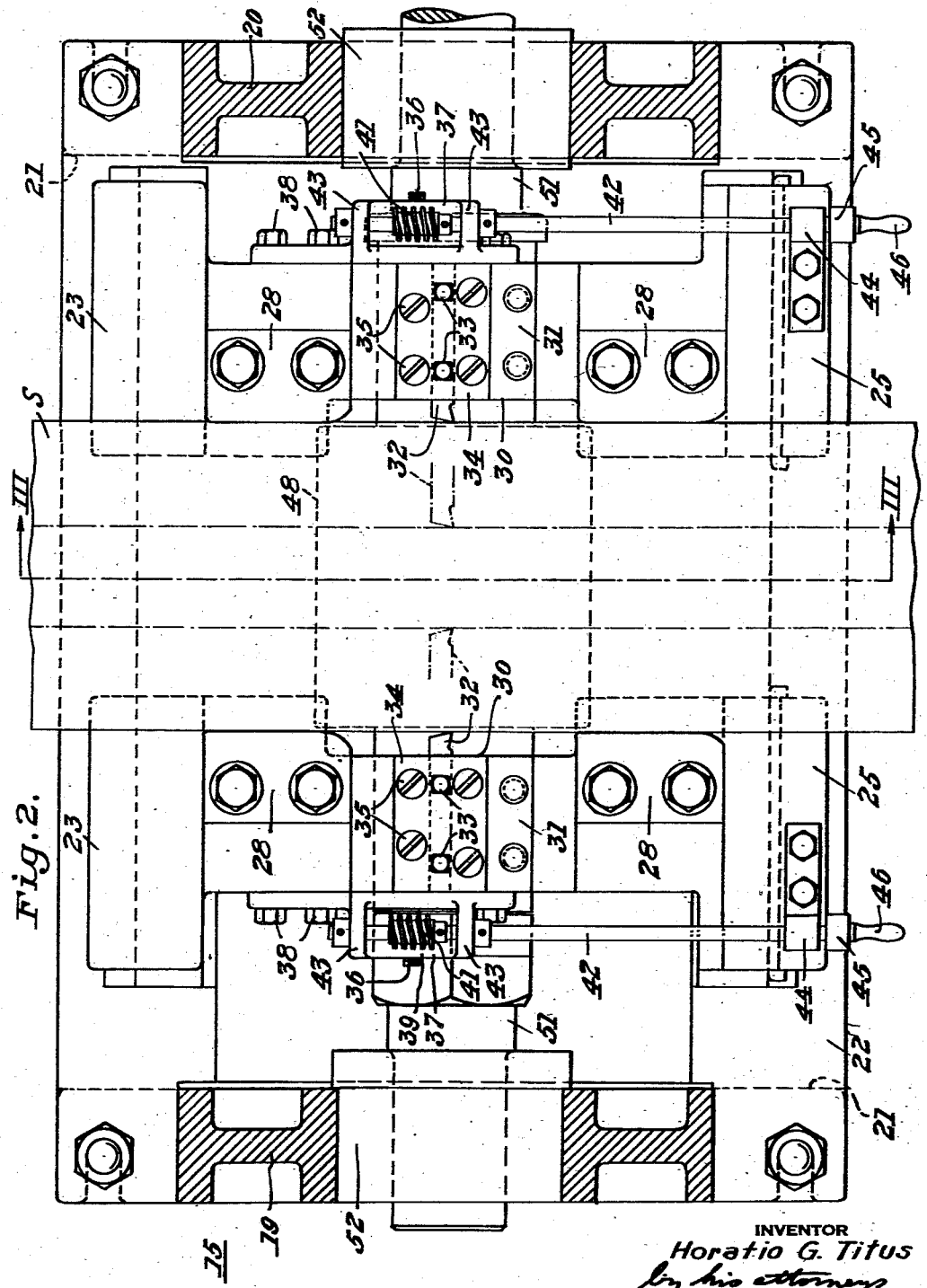
Fig. 2 is a plan view of the apparatus of my invention with parts in section along the plane of the skelp passing therethrough.

After slitting, the individual skelp lengths are fed successively through the apparatus shown in Figs. 2 through 4 and thence into a series of forming passes illustrated diagrammatically in Fig. 5. The apparatus of Figs. 2, 3 and 4 may conveniently be the initial stand of the forming apparatus indicated at 15 in Fig. 5, as this stand is usually a flat pass or pinch roll stand. Succeeding stands of the forming pass are indicated at 16, 17 and 18, and operate in the well-known manner progressively to bend the flat skelp into cylindrical form to produce a blank for welding to form pipe.

Referring now more particularly to Figs. 2 through 4, the roll stand 15 comprises spaced housings 19 and 20 mounted on any suitable support or foundation. Lugs 21 formed on opposite sides of the housings support a plate 22 extending therebetween. Shoes 23 are disposed in pairs on opposite sides of the plate 22. The pair of shoes adjacent each housing provides ways 24 whereon a bracket 25 is slidably supported. Gibs 26 bolted to the overhanging ends of the bracket engage the lower surfaces of the ways 24 to retain the bracket thereon. The brackets 25 are slotted or recessed as at 27 to receive guide blocks 28. Each bracket is also slotted as at 29 slidably to receive a tool holder 30. A gib 31 secures the holder in position on the bracket while permitting sliding movement thereon. A cutting tool 32 is adjustably secured to the holder 30 by set screws 33. The set screws traverse a top plate 34 forming part of the holder and secured to the lower portion thereof by screws 35.

A threaded stud 36 projects rearwardly of the holder 30 through a bearing block 37 secured to the side of the bracket 25 by screws 38. The block 37 has spaced side walls 39 between which is positioned a worm wheel 40 threaded on the stud 36. A worm 41 meshing with the wheel 40 is secured to a shaft 42. The shaft 42 is journaled in bearings 43 extending upwardly from the block 37 and a bearing 44 secured to bracket 25 adjacent one end thereof. A crank 45 secured to the shaft 42 has a handle 46 whereby the tool holder 30 may be adjusted manually along its path of travel. For greater accuracy of adjustment, the crank may be provided with a pointer and a graduated, circular dial mounted on the bearing 44 to show the relative position of the edge of the tool.

Rolls 47 and 48 have body portions 49 and 50 and reduced necks or arbors 51 journaled in bearing chucks 52 which are slidably mounted in the windows of the housings 19 and 20. The body portions of the rolls are held in proper positions on the arbors 51 by spacing sleeves 53, one of which abuts a shoulder 54, the other of which is engaged by nuts 55 screwed thereagainst on a threaded portion 56 of the arbor.

The cutting tool, its supporting and adjusting means, are duplicated on opposite sides of the stand 15 as best shown in Figs. 2 and 4. It may also be desirable to provide similar edge trimming apparatus on the second stand of the forming mill which is also a flat pinch roll pass, usually, so that two cuts along the edges of the skelp blank may be made if desirable, to remove the desired thickness of material.

It will be understood that the skelp when entered between the rolls 47 and 48 is moved forward thereby, suitable provision being made for driving the rolls at the desired speed. As the skelp enters the bite of the rolls, it is gripped firmly thereby substantially throughout its entire width. The guides 28 confine the skelp against lateral shifting. The cutting tools 32 engage the edges of the forwardly moving skelp substantially at the transverse plane containing the axes of the rolls. As shown in Figs. 2 and 3, the bodies 49 and 50 of the rolls have a width of face slightly less than the width of the skelp passing therethrough indicated at S.

The initial adjustment of the cutting tools is effected by loosening the screws securing the gibs 26 to the ends of the brackets, whereupon the latter may be moved manually along the ways 24 of the shoes 23. When the screws have again been tightened, a fine adjustment of the cutting tool toward or from the edge of the skelp may be made by turning the crank 45. The guide blocks 28 being rigidly secured to the brackets are properly positioned by movement of the brackets themselves. By means of the double adjustment, the cutting tools may be set for trimming various skelp widths as indicated in chain lines in Fig. 2. It will be understood that rolls having narrower faces than those of rolls 49 and 50 will be substituted for the latter when trimming narrow skelp.

The cutting tools 32 may have various types of cutting edges. Instead of the straight edges perpendicular to the width of the skelp as shown in the drawings, the edges may be at an angle or may be curved. Thus by properly choosing the shape of the cutting edge, the desired contour may be given to the edges of the skelp so that these edges when brought into engagement as the result of the forming and welding operations, will initially contact at the outside or the inside or may have flat abutting engagement through substantially their entire area as may be desired.

Numerous advantages of my invention will readily occur to those skilled in the art. In the first place, any lack of uniformity in the width of the skelp resulting from the slitting is removed so that the edges of the trimmed skelp when formed and abutted are subjected to uniform pressure when being passed through the welding throat without introducing any variations into the operation of the welding machine by reason of non-uniform contact pressure between the abutting edges. The trimming of the edges removes the burr resulting from slitting and the accurate machining of the skelp edges makes it possible to weld them together without producing a large bead along the seam. As already stated, in fact, the size of the bead is such that the use of a mandrel extending into the tube as it is welded for the purpose of working the interior bead, is no longer necessary. Briefly, the invention makes it possible to produce more uniform stock for welding than has been obtainable with slitting or shearing apparatus previously used and thus makes for better welds, and more uniform structure in the welded seam. The invention may, as above described, be incorporated in the usual forming mill and, therefore, does not add materially to the cost of making the blanks. The apparatus involved is simple and relatively inexpensive to manufacture and maintain.

Although I have illustrated and described herein but a preferred practice and embodiment of the invention, it will be understood that changes therein may be made without departing from the spirit of the invention or the scope of the appended claims.

I claim:

1. Apparatus for preparing skelp for welding comprising a pair of fixed housings spaced apart, pinch rolls having cylindrical body portions and necks extending from both ends of the body portions, said necks being journaled in said housings, a bracket extending between said rolls and between the bodies thereof and one of said housings, a tool holder mounted on said bracket and a tool disposed in said holder for cutting engagement with an edge of a skelp length passing between said rolls.

2. Apparatus for preparing skelp for welding comprising a pair of fixed housings spaced apart, pinch rolls having cylindrical body portions and necks extending from both ends of the body portions, said necks being journaled in said housings, a bracket extending between said rolls and between the bodies thereof and one of said housings, a tool holder mounted on said bracket, a tool disposed in said holder for cutting engagement with an edge of a skelp length passing between said rolls, and means mounting said bracket for movement toward and from said edge.

3. Apparatus for preparing skelp for welding comprising a pair of fixed housings spaced apart, pinch rolls having cylindrical body portions and necks extending from both ends of the body portions, said necks being journaled in said housings, a bracket extending between said rolls and between the bodies thereof and one of said housings, shoes on opposite sides of the plane passing through the axes of said rolls, said bracket being mounted on said shoes for movement toward and from the body portions of said rolls, and a tool mounted on said bracket adapted to have cutting engagement with a strip passing through said rolls.

4. Apparatus for preparing skelp for welding comprising a pair of fixed housings spaced apart, pinch rolls having cylindrical body portions and necks extending from both ends of the body portions, said necks being journaled in said housings, a bracket extending between said rolls and between the bodies thereof and one of said housings, a tool holder on said bracket, means mounting said holder for movement axially of said rolls, and means for moving said holder.

5. Apparatus for preparing skelp for welding comprising a pair of fixed housings spaced apart, pinch rolls having cylindrical body portions and necks extending from both ends of the body portions, said necks being journaled in said housings, a bracket extending between said rolls and between the bodies thereof and one of said housings, a tool holder on said bracket, means mounting said holder for movement axially of said rolls, and means for moving said holder, said last-mentioned means including a shaft extending outwardly from said holder along said bracket.

HORATIO G. TITUS.